US012567007B2

(12) United States Patent
Ibrahim

(10) Patent No.: US 12,567,007 B2
(45) Date of Patent: Mar. 3, 2026

(54) AUTOMATED REMOTE TRANSACTIONS BETWEEN A VEHICLE AND A LODGING SYSTEM

(71) Applicant: American Express Travel Related Services Company, Inc., New York, NY (US)

(72) Inventor: Wael Ibrahim, San Diego, CA (US)

(73) Assignee: American Express Travel Related Services Company, Inc., New York, NY (US)

(*) Notice: Subject to any disclaimer, the term of this patent is extended or adjusted under 35 U.S.C. 154(b) by 264 days.

(21) Appl. No.: 17/852,850

(22) Filed: Jun. 29, 2022

(65) Prior Publication Data

US 2022/0343226 A1     Oct. 27, 2022

Related U.S. Application Data

(63) Continuation of application No. 16/008,530, filed on Jun. 14, 2018, now Pat. No. 11,416,784.

(51) Int. Cl.
| | |
|---|---|
| *G06Q 10/02* | (2012.01) |
| *G06Q 20/08* | (2012.01) |
| *G06Q 20/32* | (2012.01) |
| *G06Q 20/38* | (2012.01) |
| *G06Q 20/40* | (2012.01) |

(Continued)

(52) U.S. Cl.
CPC ........... *G06Q 10/02* (2013.01); *G06Q 20/085* (2013.01); *G06Q 20/325* (2013.01); *G06Q 20/3829* (2013.01); *G06Q 20/40* (2013.01); *G06Q 20/40145* (2013.01); *G07C 9/29* (2020.01);

(Continued)

(58) Field of Classification Search
None
See application file for complete search history.

(56) References Cited

U.S. PATENT DOCUMENTS

| | | | |
|---|---|---|---|
| 8,863,256 B1 | 10/2014 | Addepalli et al. | |
| 9,171,268 B1* | 10/2015 | Penilla | ...................... B60L 1/06 |

(Continued)

FOREIGN PATENT DOCUMENTS

| | | |
|---|---|---|
| CN | 103546578 A | 1/2014 |

OTHER PUBLICATIONS

"Ditch the Wallet and Pay With Your Car," by Doug Newcomb, Feb. 26, 2016 (Year: 2016).*

(Continued)

*Primary Examiner* — Michael P Harrington
*Assistant Examiner* — Brian Adams Heflin
(74) *Attorney, Agent, or Firm* — Sterne, Kessler, Goldstein & Fox, P.L.L.C.

(57) ABSTRACT

A system and method is disclosed for automated remote transactions between a vehicle and a lodging system The system may enable the vehicle to initiate an automated remote transaction to the lodging system to book an accommodation and complete a remote payment. The lodging system may transmit available accommodations to the vehicle. The vehicle may respond with a booking request comprising an accommodation selection and vehicle identifying data and the lodging system may communicate the vehicle identifying data to a payment network to authorize the remote transaction. In response to authorizing the remote transaction, the lodging system may complete the booking request with the vehicle.

18 Claims, 4 Drawing Sheets

(51) Int. Cl.
    *G07C 9/29*        (2020.01)
    *H04W 4/024*      (2018.01)
    *H04W 4/44*       (2018.01)

(52) U.S. Cl.
    CPC ............. *H04W 4/024* (2018.02); *H04W 4/44*
    (2018.02); *G06Q 2240/00* (2013.01)

(56) References Cited

U.S. PATENT DOCUMENTS

| | | | |
|---|---|---|---|
| 10,469,248 B2 | 11/2019 | Chalakudi et al. | |
| 10,567,320 B2 | 2/2020 | Chalakudi et al. | |
| 10,642,967 B2 | 5/2020 | Balaraman et al. | |
| 10,832,247 B2 | 11/2020 | Durvasula et al. | |
| 11,113,690 B2 * | 9/2021 | Woods ................. | G06Q 20/405 |
| 2002/0049535 A1 * | 4/2002 | Rigo .................. | G01C 21/3629 |
| | | | 455/436 |
| 2005/0261945 A1 * | 11/2005 | Mougin ................. | G06Q 10/02 |
| | | | 705/5 |
| 2006/0282660 A1 * | 12/2006 | Varghese .............. | G07F 7/1083 |
| | | | 713/155 |
| 2008/0091480 A1 | 4/2008 | Geoghegan et al. | |
| 2010/0280956 A1 * | 11/2010 | Chutorash ............. | G07F 13/025 |
| | | | 705/64 |
| 2012/0166334 A1 * | 6/2012 | Kimberg .............. | G06Q 20/227 |
| | | | 705/44 |
| 2016/0180344 A1 * | 6/2016 | Studnicka ........... | G06Q 20/425 |
| | | | 705/44 |
| 2017/0046672 A1 * | 2/2017 | Cha ...................... | G08G 1/0175 |
| 2018/0018664 A1 * | 1/2018 | Purves ............. | G06Q 20/40145 |
| 2019/0057379 A1 | 2/2019 | Chalakudi et al. | |
| 2019/0108542 A1 | 4/2019 | Durvasula et al. | |
| 2019/0164157 A1 | 5/2019 | Balaraman et al. | |
| 2019/0303920 A1 | 10/2019 | Balaraman et al. | |
| 2019/0303942 A1 | 10/2019 | Balaraman et al. | |
| 2021/0110357 A1 * | 4/2021 | Wisniewski ......... | G06Q 50/167 |

OTHER PUBLICATIONS

"What Are In-Vehicle Payments and How to Develop Such Solutions?," by Host Merchant Services, Sep. 16, 2021 (Year: 2021).*
"Implementation and performance evaluation of a payment protocol for vehicular ad hoc networks," by Jesus Tellez Issac, Sherali Zeadally, and Jose Camara Sierra, Jul. 11, 2010, (hereinafter Protocol). (Year: 2010).*
International Search Report and Written Opinion of the International Searching Authority directed to related International Patent Application No. PCT/US2019/036479, mailed Aug. 29, 2019; 6 pages.

* cited by examiner

301

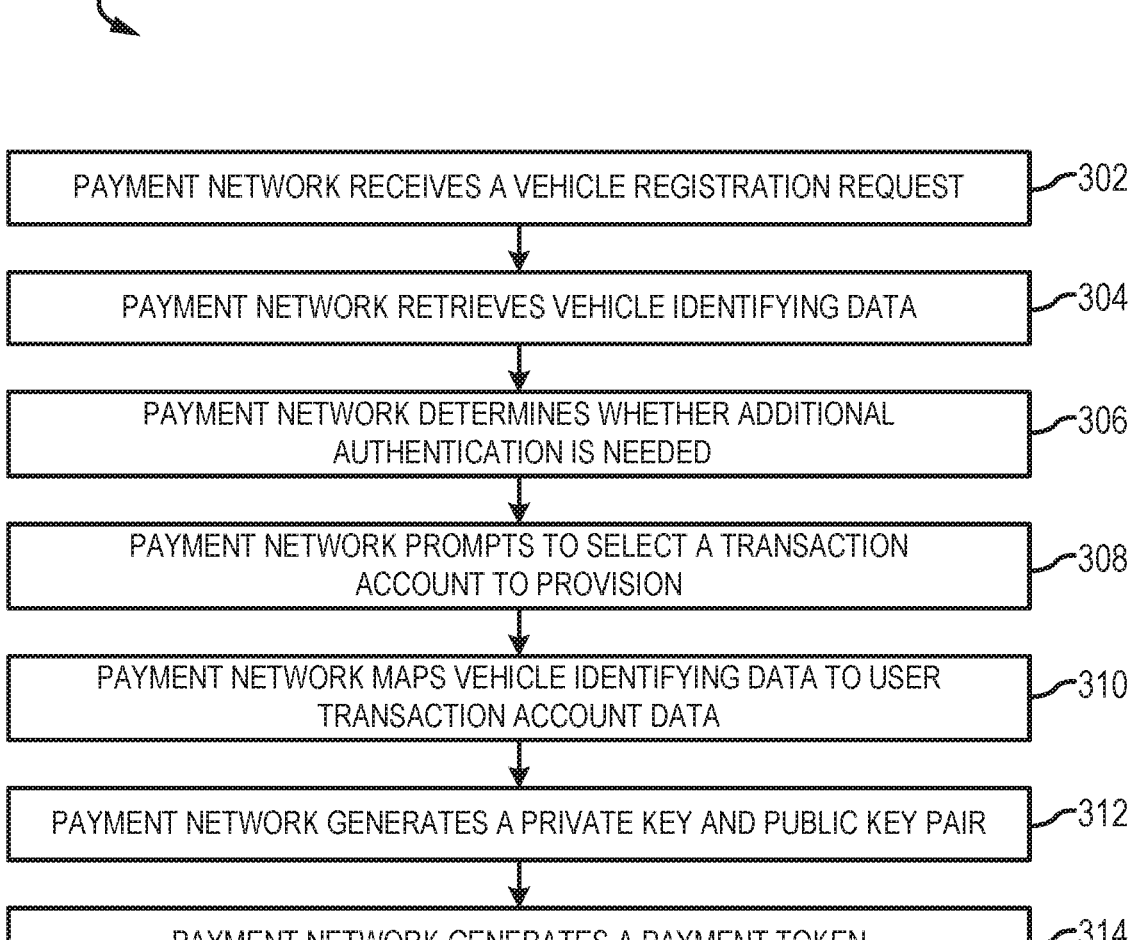

PAYMENT NETWORK RECEIVES A VEHICLE REGISTRATION REQUEST ⟋302

PAYMENT NETWORK RETRIEVES VEHICLE IDENTIFYING DATA ⟋304

PAYMENT NETWORK DETERMINES WHETHER ADDITIONAL AUTHENTICATION IS NEEDED ⟋306

PAYMENT NETWORK PROMPTS TO SELECT A TRANSACTION ACCOUNT TO PROVISION ⟋308

PAYMENT NETWORK MAPS VEHICLE IDENTIFYING DATA TO USER TRANSACTION ACCOUNT DATA ⟋310

PAYMENT NETWORK GENERATES A PRIVATE KEY AND PUBLIC KEY PAIR ⟋312

PAYMENT NETWORK GENERATES A PAYMENT TOKEN ⟋314

FIG. 3

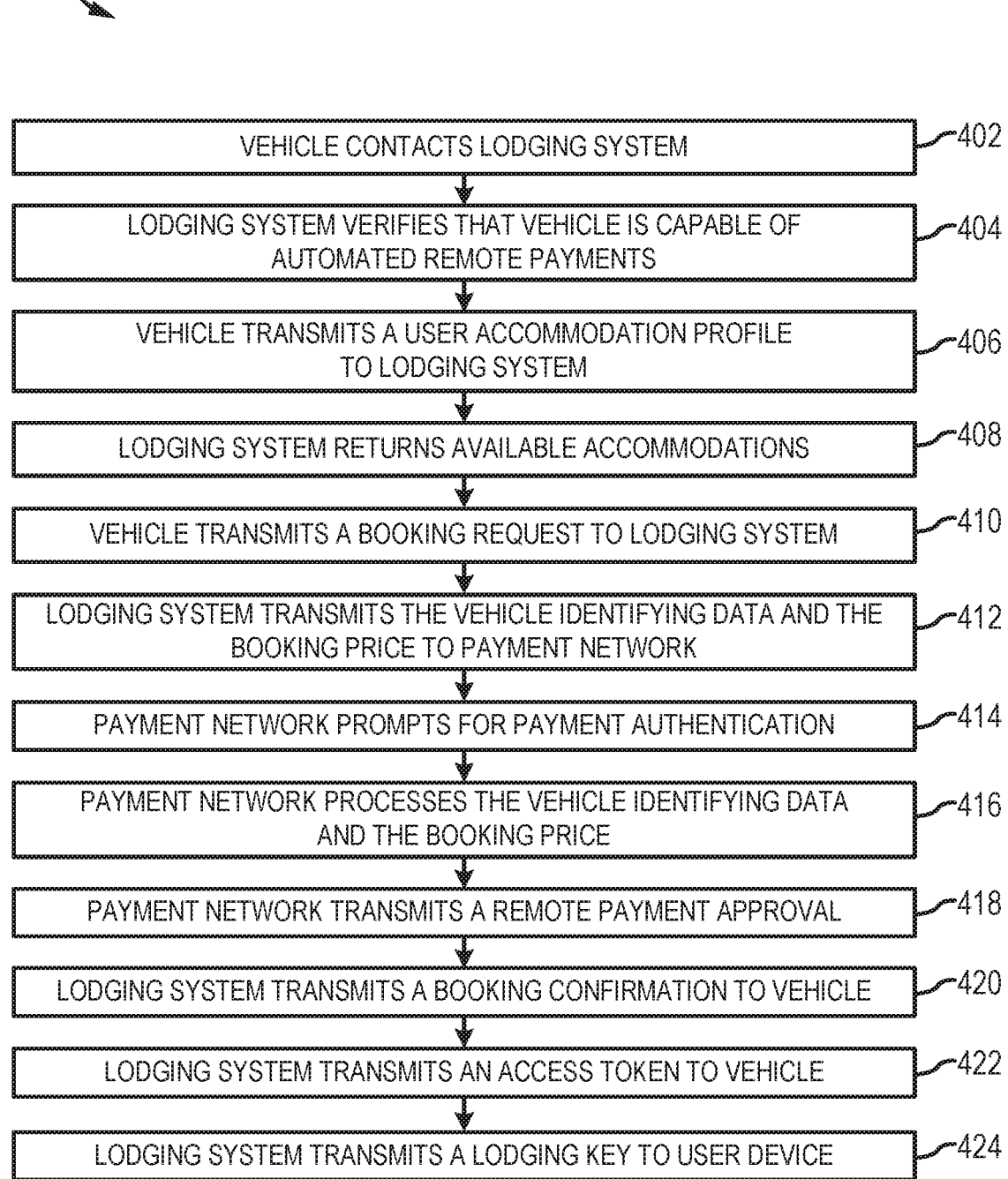

401

| VEHICLE CONTACTS LODGING SYSTEM | 402 |

| LODGING SYSTEM VERIFIES THAT VEHICLE IS CAPABLE OF AUTOMATED REMOTE PAYMENTS | 404 |

| VEHICLE TRANSMITS A USER ACCOMMODATION PROFILE TO LODGING SYSTEM | 406 |

| LODGING SYSTEM RETURNS AVAILABLE ACCOMMODATIONS | 408 |

| VEHICLE TRANSMITS A BOOKING REQUEST TO LODGING SYSTEM | 410 |

| LODGING SYSTEM TRANSMITS THE VEHICLE IDENTIFYING DATA AND THE BOOKING PRICE TO PAYMENT NETWORK | 412 |

| PAYMENT NETWORK PROMPTS FOR PAYMENT AUTHENTICATION | 414 |

| PAYMENT NETWORK PROCESSES THE VEHICLE IDENTIFYING DATA AND THE BOOKING PRICE | 416 |

| PAYMENT NETWORK TRANSMITS A REMOTE PAYMENT APPROVAL | 418 |

| LODGING SYSTEM TRANSMITS A BOOKING CONFIRMATION TO VEHICLE | 420 |

| LODGING SYSTEM TRANSMITS AN ACCESS TOKEN TO VEHICLE | 422 |

| LODGING SYSTEM TRANSMITS A LODGING KEY TO USER DEVICE | 424 |

FIG. 4

AUTOMATED REMOTE TRANSACTIONS BETWEEN A VEHICLE AND A LODGING SYSTEM

CROSS-REFERENCE TO RELATED APPLICATIONS

This application is a Continuation of, and claims priority to and benefit of U.S. patent application Ser. No. 16/008,530 filed on Jun. 14, 2018 which is incorporated herein by reference in their entirety.

FIELD

This disclosure generally relates to transactions involving a lodging system, and more particularly, to systems and methods for automated remote transactions between a vehicle and a lodging system.

BACKGROUND

Users may book a hotel room using an online portal, over a telephone call with a customer service representative, or by walking in and providing the information to the front desk. For example, the user may specify and/or select from various room specifications available based on the duration of the stay. Upon booking the room and visiting the hotel, the user may need to engage a hospitality desk, front desk, or the like to physically complete the check-in process, receive the key for the hotel room, receive a parking permit, receive directions to the hotel room, or the like. Further, users may desire to book a hotel room while operating a vehicle (or as a passenger) such as, for example, while driving at night, during a road trip, or the like. Users may encounter difficulties in booking a hotel room in this manner. For example, users may have difficulties locating a hotel, locating a hotel having vacancies, finding a room matching the user's room specifications, or finding a room having acceptable rates or amenities.

SUMMARY

A system, method, and computer readable medium (collectively, the "system") is disclosed for automated remote transactions between a vehicle and a lodging system. The system may comprise a remote transaction system in a vehicle. The remote transaction system may receive an available accommodation from a lodging system, wherein the lodging system is configured to transmit the available accommodation in response to the remote transaction system contacting the lodging system to initiate an automated remote transaction. The remote transaction system may transmit, using a trusted platform module (TPM) to provide trust and security, a booking request to the lodging system. The booking request may comprise an accommodation selection based on the available accommodation, a booking price, and vehicle identifying data. In response to receiving the booking confirmation, the lodging system may be configured to transmit the vehicle identifying data and the booking price to a payment network to authorize the automated remote transaction. The remote transaction system may receive, from the payment network, a remote payment approval in response to the payment network authorizing the automated remote transaction. The payment network is configured to transmit the remote payment approval to the remote transaction system and the lodging system. In response to receiving the remote payment approval, the lodging system is configured to complete booking of the accommodation selection.

In various embodiments, the remote transaction system may transmit a user accommodation profile to the lodging system, wherein the lodging system is configured to transmit the available accommodation based on the user accommodation profile. The remote transaction system may also receive a booking confirmation from the lodging system in response to the lodging system completing booking of the accommodation selection, wherein the booking confirmation comprises GPS directions to the accommodation selection. The booking request may comprise a user device phone number. In response to completing booking of the accommodation selection, the lodging system is configured to transmit a lodging key to a user device associated with the user device phone number. The remote transaction system may receive a provisioned parking access token from the lodging system in response to the lodging system completing booking of the accommodation selection.

In various embodiments, the remote transaction system may transmit a remote transaction registration request to the payment network, wherein in response to receiving the remote transaction registration request the payment network prompts the remote transaction system to transmit vehicle identifying data. The remote transaction system may transmit the vehicle identifying data to the payment network, wherein the payment network is configured to associate the vehicle identifying data with transaction account data. The remote transaction system may receive a private key and public key pair from the payment network, wherein the private key and public key pair are stored in the TPM. The remote transaction system may transmit a transaction account number to provision for automated remote transactions, wherein the payment network is configured to generate a payment token based on the transaction account corresponding to the transaction account number.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

FIG. 3 illustrates a process flow for registering a vehicle for automated remote transactions, in accordance with various embodiments; and FIG. 4 illustrates a process flow for automated remote transactions between a vehicle and a lodging system, in accordance with various embodiments.

DETAILED DESCRIPTION

Figure 1:
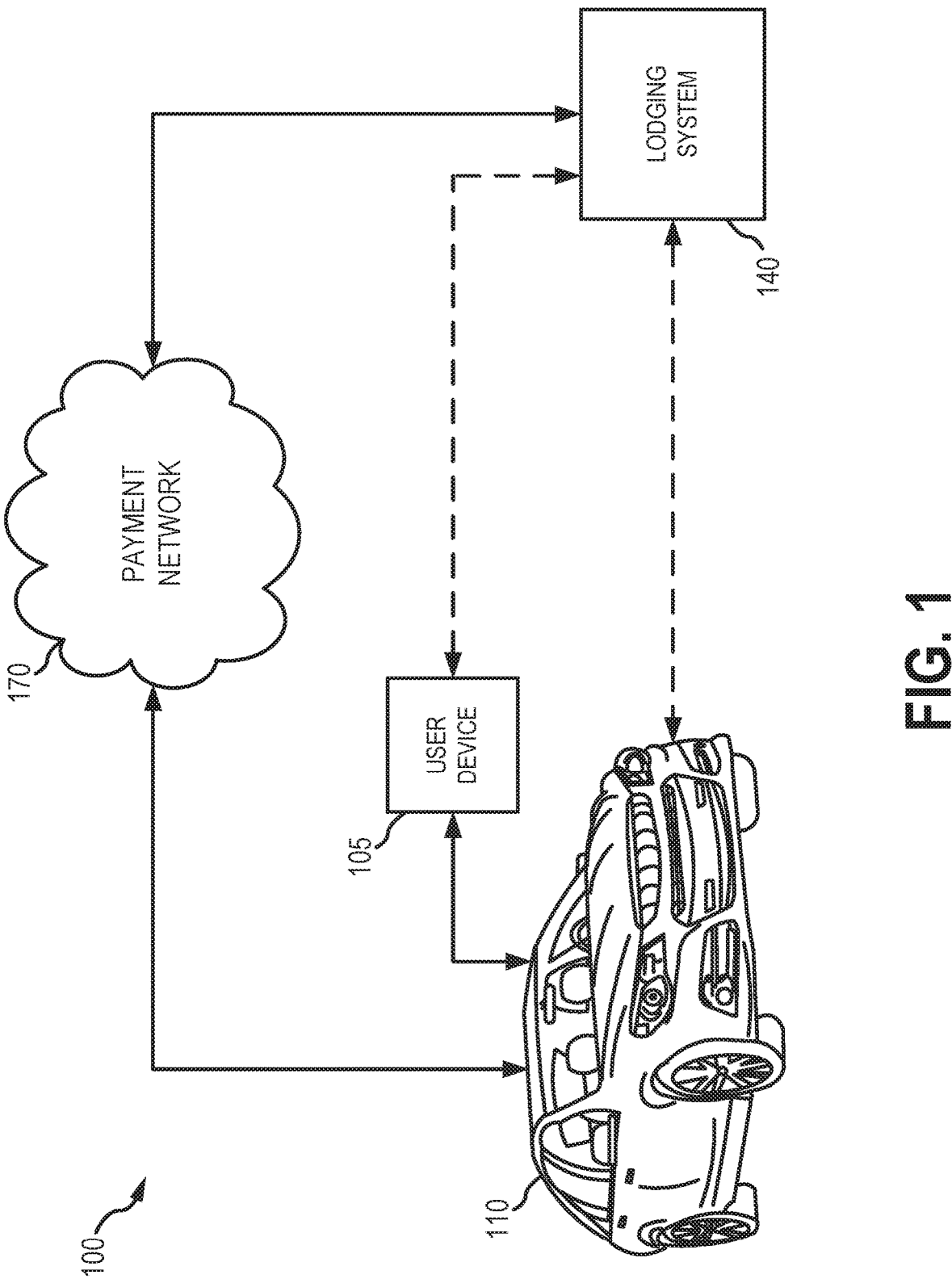
FIG. 1 is a block diagram illustrating a system for automated remote transaction between a vehicle and a lodging system, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, systems, methods, and computer readable mediums (collectively, the "system") for automated remote transactions between a vehicle and a lodging system are disclosed. The system may enable the vehicle to initiate an automated remote transaction with the lodging system. For example, the vehicle may initiate the automated remote transaction to book an accommodation, to complete payment for the accommodation, and/or the like. The communications may be completed using an Internet of things (IoT) device in the vehicle. The vehicle may engage the lodging system to inquire about nearby (e.g., 5 miles, 10 miles, etc.) accommodations, to obtain available room specifications, to obtain amenities at nearby accommodations, to book the accommodation, and to initiate a remote payment between the vehicle and the lodging system, via a payment network. The lodging system may transmit an access token to the vehicle to enable the vehicle to enter a parking structure associated with the accommodation. The lodging system may also transmit a lodging key to a user device corresponding to the user of the vehicle, to enable the user to access the accommodation without needing to first check in to a front desk, concierge, or the like.

The system and process improves the functioning of the computer. For example, by transmitting, storing, and accessing data using the processes described herein, the security of the data is improved, which decreases the risk of the computer, network, or transaction account number from being compromised. In that regard, the system and process may improve security at the device and/or software level, and may improve security of data transmissions in the payment network. Moreover, the system and process may decrease fraudulent transactions and the susceptibility of payment information being compromised over the payment network. In various embodiments, the system and process may also decrease user time and effort spent searching for lodging based on specific user need while operating a vehicle, placing a reservation at the lodging, locating the lodging, and accessing parking and/or the lodging room, as discussed further herein. Further, the system and process may make receipts and accounting documentations readily available for the user to ease the task of accounting and reimbursements (e.g., for business travel). In various embodiments, the system and process may also automate functionalities typically performed at a check-in desk at a place of lodging (e.g., a concierge desk, hotel front desk, etc.), thus decreasing user (e.g., hotel staff) input into a reservation system.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a system 100 for automated remote transactions between a vehicle and a lodging system is depicted, according to various embodiments. System 100 may comprise one or more of a user device 105, a vehicle 110, a lodging system 140, and/or a payment network 170. System 100 may enable one or more vehicles 110 to initiate and complete automated remote transactions with one or more lodging systems 140 to book an accommodation and complete payment for the accommodation. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, user device 105 may be in logical and/or electronic communication with vehicle 110 and/or lodging system 140. User device 105 may comprise any suitable hardware, software, and/or database components capable of sending, receiving, and storing data. For example, user device 105 may comprise a personal computer, personal digital assistant, cellular phone, smartphone (e.g., IPHONE®, BLACKBERRY®, and/or the like), Internet of things (IoT) device, and/or the like. User device 105 may comprise an operating system, such as, for example, a WINDOWS® mobile operating system, an ANDROID® operating system, APPLE® IOS®, a BLACKBERRY® operating system, a LINUX operating system, and the like. User device 105 may be configured to interact with multimedia center 215 of vehicle 110, such as, for example, to enable a user to make phone calls using multimedia center 215 (e.g., via a Bluetooth connection). User device 105 may also be configured to receive and store one or more lodging keys from lodging system 140 during the automated remote transaction process, as discussed further herein.

In various embodiments, vehicle 110 may comprise any suitable or desired vehicle such as, for example, a car, a truck, a sports utility vehicle (SUV), a motorcycle, a scooter, an all-terrain vehicle (ATV), a utility terrain vehicle (UTV), a golf cart, an electric bicycle, a boat, and/or any other type of vehicle. Vehicle 110 may comprise any number of systems and subsystems such as, for example, an engine (which may include lubrication systems, cooling systems, etc.), a fuel system, an ignition system, an exhaust system, an electrical system, a drive train, a frame and/or body (which may include wheels and tires), a suspension system, a steering system, a braking system, and/or any other suitable or desired systems. Vehicle 110 may also comprise supplementary systems or sub-systems, such as, for example a supplementary restraint system (e.g., having seat belts, air bags, etc.), a climate control system, an entertainment system (e.g., a multimedia center, a sound system, a communications system, etc.), a global positioning system (GPS), and/or the like.

Figure 2:
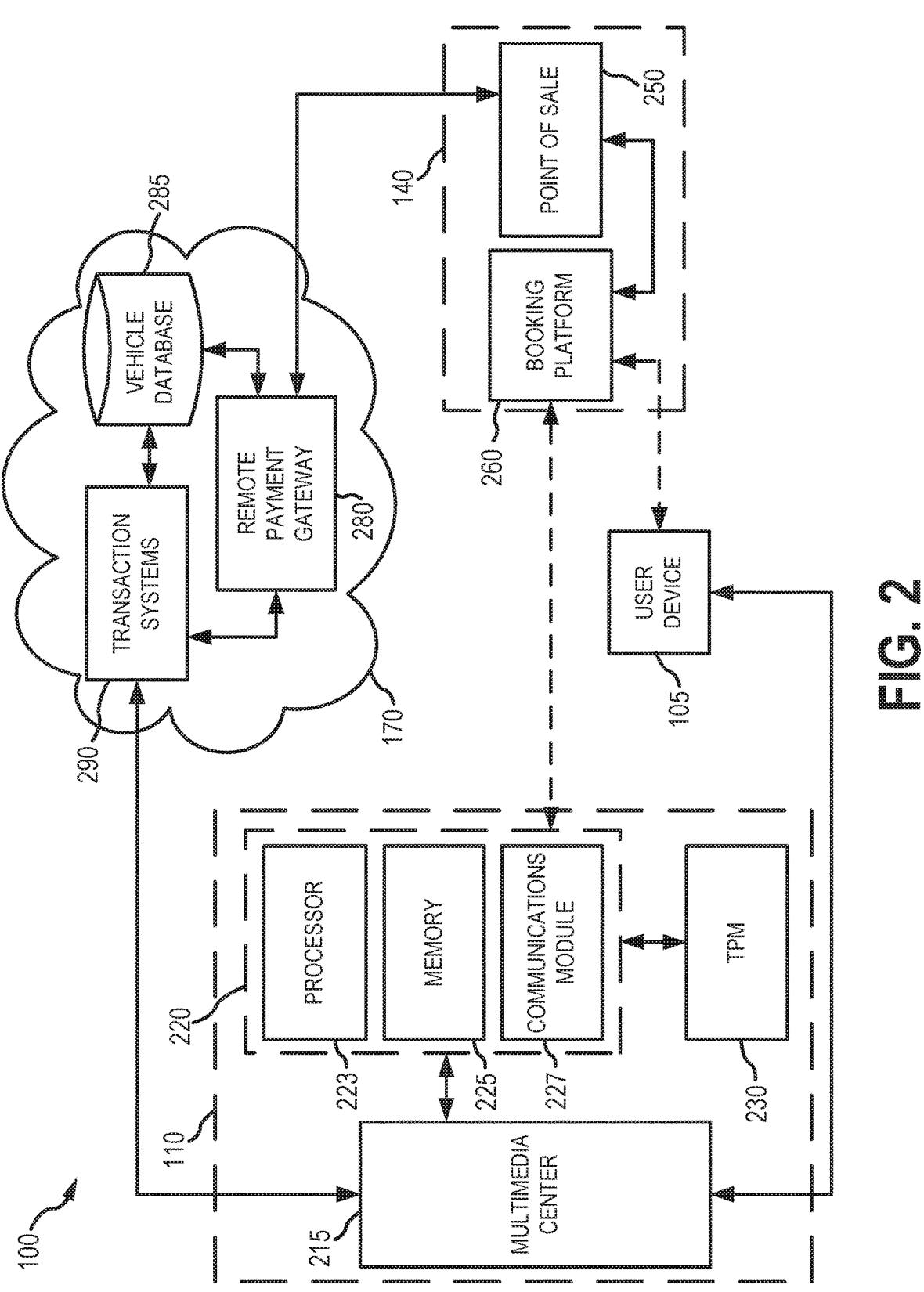
FIG. 2 is a block diagram illustrating exemplary system components in a system for automated remote transactions between a vehicle and a lodging system, in accordance with various embodiments.

In various embodiments, and with reference to FIG. 2, components of vehicle 110 are depicted in greater detail. Vehicle 110 may comprise one or more of a multimedia center 215, a remote transaction system 220, and/or a trusted platform module (TPM) 230. The various systems, modules, platforms, centers, and the like in vehicle 110 may be in direct logical communication with each other via a bus, network, and/or through any other suitable means, or may be individually connected as described further herein. For the sake of brevity, conventional data networking, application development, and other functional aspects of vehicle 110 (and components of the individual operating components of vehicle 110) may not be described in detail herein. Furthermore, the connecting lines shown in the various figures contained herein are intended to represent exemplary functional relationships and/or physical couplings between the various elements in vehicle 110. It should be noted that many alternative or additional functional relationships or physical connections may be present in a practical system. For example, and in accordance with various embodiments, one or more components of vehicle 110 may be interconnected via, a controller area network (CAN) or CAN bus in vehicle 110.

In various embodiments, multimedia center 215 may comprise a control mechanism to allow a user to access and control various components of vehicle 110 such as, for example, the climate control system, the radio and/or sound system, the GPS system, remote transaction system 220, and the like. Multimedia center 215 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. Multimedia center 215 may also comprise a user interface in logical communication with the processor. The user interface may comprise a touchscreen or similar display capable of displaying a graphical user interface and accepting user input. Multimedia center 215 may also comprise (and/or be in logical communication with) one or more networking interfaces. A network interface may allow data to be transferred between multimedia center 215 and external devices or components. For example, the network interface may comprise a modem, an Ethernet card, a communications port, a Personal Computer Memory Card International Association (PCMCIA) slot and card, or the like. Data transferred over the network interface may be in the form of signals which may be electronic, electromagnetic, optical, or other signals capable of being transmitted and received by the network interface. The network interface may transmit data using any wireless transmission standard such as, for example, Bluetooth, Wi-Fi, over a cellular network, or using any other suitable or desired wireless transmission. In various embodiments, multimedia center 215 may also interface with user device 105 to provide communications over the cellular network provided via user device 105.

In various embodiments, multimedia center 215 may also comprise (and/or be in logical communication with) a biometric security system. The biometric security system may be used for providing biometrics as a secondary form of identification. The biometric security system may include a biometric sensor that detects biometric samples. The biometric security system may be configured with one or more biometric scanners, processors and/or systems. The biometric security system may include one or more technologies, or any portion thereof, configured to detect and receive a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

In various embodiments, a user may also interact with multimedia center 215 using a smart digital assistant technology, a voice service, or the like. For example, multimedia center 215 may integrate with a smart digital assistant technology such as the ALEXA system developed by AMAZON®, GOOGLE HOME®, APPLE® HOMEPOD®, and/or similar digital assistant technologies. AMAZON® ALEXA, GOOGLE HOME®, and APPLE® HOMEPOD®, may each provide cloud-based voice activation services that can assist with tasks, entertainment, general information, and more. All AMAZON® ALEXA devices, such as the AMAZON ECHO®, AMAZON ECHO DOT®, AMAZON TAP®, and AMAZON FIRE® TV, have access to the ALEXA system. The ALEXA, GOOGLE HOME®, and APPLE® HOMEPOD® systems may receive voice commands via its voice activation technology, and activate other functions, control smart devices, and/or gather information. For example, the smart digital assistant technologies may be used to interact with music, mails, texts, calling, question answering, home improvement information, smart home communication/activation, games, shopping, making to-do lists, setting alarms, streaming podcasts, playing audiobooks, and providing weather, traffic, and other real time information, such as news. The ALEXA, GOOGLE HOME®, and APPLE® HOMEPOD® systems may also allow the user to access information about eligible transaction accounts linked to an online account across all digital assistant-enabled devices, issue commands to multimedia center 215, control automated remote transactions between vehicle 110 and lodging system 140, and/or the like.

In various embodiments, remote transaction system 220 may be configured to allow vehicle 110 to register for automated remote transactions and to complete transactions and payments at one or more lodging systems 140. Remote transaction system 220 may be in logical and/or electronic communication with multimedia center 215 and/or TPM 230. Remote transaction system 220 may also be in logical and/or electronic communication with internal components and systems of vehicle 110 such as, for example the GPS and/or the like. As discussed further herein, remote transaction system 220 may also be configured to communicate with lodging system 140 and/or payment network 170. Remote transaction system 220 may comprise an Internet of Things (IoT) device, such as, for example a RASPBERRY PI®. Remote transaction system 220 may comprise at least one computing device in the form of a computer or processor, or a set of computers/processors. In various embodiments, remote transaction system 220 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, remote transaction system 220 may comprise one or more of a processor 223, a memory 225, and/or a communications module 227. Processor 223 may comprise any number of processors, and may also include any combination of processing circuits known in the art, such as one or more microprocessors, microcontrollers, digital signal processors, and/or programmable logic devices. Processor 223 may be configured to execute instructions stored on a tangible, non-transitory computer readable medium, causing processor 223 to perform various operations, as discussed further herein.

Memory 225 may be configured to provide secure storage to remote transaction system 220. For example, memory 225 may comprise read-only protected memory and may be populated with vehicle identifying data and/or user date. The vehicle identifying data may comprise characteristics corresponding to vehicle 110 such as, for example, a vehicle identification number (VIN), a vehicle manufacture date, a vehicle make, a vehicle model, a vehicle license plate number, or the like. In that respect, and in accordance with various embodiments, the vehicle identifying data may be populated by the vehicle 110 manufacture prior to sale of the vehicle. The user data may comprise data such as a cell phone number (e.g., corresponding to user device 105), and/or the like. In various embodiments, data stored in memory 225 may be protected by TPM 230, such as, for example, via digital signatures, encryption, and/or any other tamper resistant detection mechanism, as discussed further herein.

Communications module 227 (e.g., the vehicle communication module) may be configured to communicate with lodging system 140 during the automated remote transaction process, as discussed further herein. Communications module 227 may comprise any suitable network interface capable of transmitting and receiving data, such as, for example a modem, an Ethernet card, a communications port, a Personal Computer Memory Card International Association (PCMCIA) slot and card, or the like. Data transferred over communications module 227 may be in the form of signals which may be electronic, electromagnetic, optical, or other signals capable of being transmitted and received by the network interface. Communications module 227 may transmit data using any wireless transmission standard such as, for example, Bluetooth, Wi-Fi, over a cellular network, or using any other suitable or desired wireless transmission. Communications module 227 may also transmit data using Bluetooth Low Energy (Bluetooth LTE) operating in the 2.4 GHz ISM band.

In various embodiments, TPM 230 may be configured to store, manage, and maintain digital keys for asymmetric encryption of data payloads, provide data cryptoprocessing and authentication of vehicle 110, and store and maintain data regarding the state and integrity of remote transaction system 220. TPM 230 may be in electronic and/or logical communication with remote transaction system 220 and may comprise any suitable combination of hardware, software, and/or database components. For example, TPM 230 may comprise a hardware security module (HSM), a microcontroller, a microchip, or any other secure hardware component capable of storing and maintaining digital encryption keys. In various embodiments, TPM 230 may be configured to act as the root of trust (RoT) in vehicle 110. For example, TPM 230 may be configured to store and maintain data regarding vehicle 110 and/or remote transaction system 220, such as, for example, software versions, current vehicle 110 metrics, and/or the like, as discussed further herein. In that regard, TPM 230 may also be configured to determine whether vehicle 110 and/or remote transaction system 220 has been tampered with, rooted, or the like. TPM 230 may report the integrity of vehicle 110, via communications module 227, and/or remote transaction system 220 to payment network 170, such as, for example, during registration and/or a payment process.

In various embodiments, during registration with payment network 170, vehicle 110 may be assigned an asymmetric private/public key pair (e.g., generated under the storage root key (SRK), a platform storage root key (P-SRK), etc.). TPM 230 may be configured to securely store the private key to allow vehicle 110 (e.g., via remote transaction system 220) to encrypt and decrypt data during transmissions in system 100. In various embodiments, TPM 230 may be configured to restrict use of and access to the private key. For example, TPM 230 may restrict use of the private key based on whether vehicle 110 is within a given location; whether vehicle 110 is running a specific version of an application, device driver, or software; whether vehicle 110 was authenticated using a biometric input; in response to vehicle 110 communicating with a specific vendor's point of sale (POS) terminal; and/or based on any other suitable restriction. In various embodiments, TPM 230 may be configured to encrypt payloads using any suitable type of encryption algorithm, such as, for example an encryption algorithm under the AES, RSA, DES or the like encryption families. TPM 230 may also be configured to digitally sign the payload prior to transmission (e.g., via communications module 227), and may implement HMAC and/or any other suitable hash-based message authentication code. TPM 230 may also be configured to ensure secure transmissions of data, via communications module 227, such as, for example, by implementing transport layer security (TLS) such as TLS 1.2.

In various embodiments, and with reference again to FIG. 1, lodging system 140 may comprise any suitable lodging system providing remote access to book accommodations. For example, lodging system 140 may comprise a booking system or platform corresponding to a hotel, motel, bed and breakfast, hostel, or the like, such as those provided by HILTON HOTELS & RESORTS®, MARRIOTT®, WYNDHAM®, or the like. As a further example, lodging system 140 may comprise a booking system or platform for vacation rentals and short term properties, such as those provided by AIRBNB®, HOMEAWAY®, VRBO®, and/or the like. As a further example, lodging system 140 may comprise a booking system or platform corresponding to an aggregate booking system, such as those provided by EXPEDIA®, TRAVELOCITY®, ORBITZ®, and/or the like. Lodging system 140 may also comprise any suitable number of subsystems, components, or the like configured to store and maintain data regarding accommodations (e.g. hotel management system, housekeeping system, maintenance system, etc.), accommodation availabilities, accommodation properties (e.g., room size, beds, amenities, etc.), accommodation prices, and/or the like; to process transactions and payments; and/or the like. In that regard, lodging system 140 may have access to any data associated with an accommodation to help determine availability. For example, lodging system 140 may be able to determine if housekeeping finished a room, so the room is ready for early check-in. Similarly, lodging system 140 may be able to determine when maintenance was finished fixing a room, such that the room is now available for booking or check-in. Lodging system 140 may also interact with the hotel accounting or check-out system to determine if a guest checks-out earlier in the day or leaves a day early than the original booking.

Lodging system 140 may be in electronic communication with payment network 170, vehicle 110, and/or user device 105. Lodging system 140 may comprise any suitable combination of hardware, software, and/or database components. Lodging system 140 may comprise at least one computing device in the form of a computer or processor, or a set of computers/processors. In various embodiments, lodging system 140 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, and with reference again to FIG. 2, lodging system 140 is depicted in greater detail. Lodging system 140 may comprise various hardware, software, and/or database components configured to complete booking transactions with vehicle 110 and authorize and settle payments with payment network 170, as discussed further herein. In that regard, and in accordance with various embodiments, lodging system 140 may comprise one or more of a point of sale 250 and/or a booking platform 260. The various systems, modules, platforms, module, and the like in lodging system 140 may be in direct logical communication with each other via a bus, network, and/or through any other suitable means, or may be individually connected as described further herein. For the sake of brevity, conventional data networking, application development, and other functional aspects of lodging system 140 (and components of the individual operating components of lodging system 140) may not be described in detail herein. Furthermore, the connecting lines shown in the various figures contained herein are intended to represent exemplary functional relationships and/or physical couplings between the various elements in lodging system 140. It should be noted that many alternative or additional functional relationships or physical connections may be present in a practical system.

Point of sale 250 may incorporate various hardware, software, and/or database components, and may include one or more processors and memory. Point of sale 250 may be in electronic and/or logical communication with booking platform 260. Point of sale 250 may be configured to enable lodging system 140 to receive remote payments from vehicle 110 and submit a request to authorize the payment to payment network 170. In that regard, point of sale 250 may be in electronic communication with payment network 170 such as, for example, via remote payment gateway 280.

In various embodiments, booking platform 260 may comprise any suitable combination of hardware, software, and/or database components, including, a server, web server, pooled servers, or the like. Booking platform 260 may also include one or more data centers, cloud storages, or the like. Booking platform 260 may be configured to receive data from and transmit data to vehicle 110 and/or user device 105. For example, booking platform 260 may be configured to transmit data regarding available accommodations, available room specifications and amenities, a booking confirmation, and/or the like, as discussed further herein. Booking platform 260 may be configured to receive from vehicle 110 a user accommodation profile, a booking request, vehicle identifying data, or the like, as discussed further herein. Booking platform 260 may also be configured to transmit an access token to vehicle 110 and/or a lodging key to user device 105. Booking platform 260 may comprise a communications module (e.g. a booking platform communications module) configured to communication with vehicle 110 to initiate an automated remote transaction. For example, the communications module may comprise any suitable network interface capable of transmitting and receiving data, such as, for example a modem, an Ethernet card, a communications port, a Personal Computer Memory Card International tional Association (PCMCIA) slot and card, or the like. Data transferred over the communications module may be in the form of signals which may be electronic, electromagnetic, optical, or other signals capable of being transmitted and received by the network interface. The communications module may transmit data using any wireless transmission standard such as, for example, Bluetooth, Wi-Fi, over a cellular network, or using any other suitable or desired wireless transmission.

In various embodiments, and with reference again to FIG. 1, payment network 170 may be configured to register one or more vehicles 110 for automated remote transactions, and authorize and complete automated remote transactions between a vehicle 110 and a lodging system 140, as discussed further herein. Payment network 170 may comprise any suitable combination of hardware, software, and/or database components. For example, payment network 170 may comprise one or more network environments, servers, computer-based systems, processors, databases, and/or the like. Payment network 170 may comprise at least one computing device in the form of a computer or processor, or a set of computers/processors, although other types of computing units or systems may be used such as, for example, a server, web server, pooled servers, or the like. Payment network 170 may also include one or more data centers, cloud storages, or the like. In various embodiments, payment network 170 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment network 170 may comprise or interact with a traditional payment network to facilitate purchases and payments, authorize transactions, and/or settle transactions. For example, payment network 170 may represent existing proprietary networks that presently accommodate transactions for credit cards, debit cards, and/or other types of transaction accounts or transaction instruments. Payment network 170 may be a closed network that is secure from eavesdroppers. In various embodiments, payment network 170 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Payment network 170 may include systems and databases related to financial and/or transactional systems and processes such as, for example, one or more authorization engines, authentication engines and databases, settlement engines and databases, accounts receivable systems and databases, accounts payable systems and databases, and/or the like. For example, payment network 170 may authorize and settle payment transactions, and maintain transaction account member databases, accounts receivable databases, accounts payable databases, or the like.

In various embodiments, phrases and terms similar to "financial institution," "transaction account issuer," "issuer system," "payment network," or the like may include any entity that offers transaction account services. Although often referred to as a "financial institution," payment network 170 may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

In various embodiments, and with specific reference to FIG. 2, components of payment network 170 are depicted in greater detail. Payment network 170 may comprise one or more of a remote payment gateway 280, a vehicle database 285, and/or a transaction systems 290. The various systems, gateways, platforms, databases, and the like in payment network 170 may be in direct logical communication with each other via a bus, network, and/or through any other suitable means, or may be individually connected as described further herein. For the sake of brevity, conventional data networking, application development, and other functional aspects of payment network 170 (and components of the individual operating components of payment network 170) may not be described in detail herein. Furthermore, the connecting lines shown in the various figures contained herein are intended to represent exemplary functional relationships and/or physical couplings between the various elements in payment network 170. It should be noted that many alternative or additional functional relationships or physical connections may be present in a practical system.

Remote payment gateway 280 may be configured to receive, authorize, and process automated remote transactions, as discussed further herein. Remote payment gateway 280 may be in electronic and/or logical communication with vehicle database 285 and/or transaction systems 290, and may comprise any suitable combination of hardware, software, and/or database components. Phrases similar to "remote payment gateway," "payment gateway" or "gateway" may include an application service provider service that authorizes payments for e-businesses, online retailers, and/or traditional brick and mortar merchants. The gateway may be the equivalent of a physical point of sale terminal located in most retail outlets. Remote payment gateway 280 may protect transaction account details by encrypting sensitive information, such as transaction account numbers, to ensure that information passes securely between the customer and the merchant and also between merchant and payment processor. Remote payment gateway 280 may be configured to process payments for a particular geographic region, use, or the like. In that respect, payment network 170 may comprise one or more remote payment gateways 280.

Vehicle database 285 may be configured to store and maintain data regarding each vehicle 110. For example, vehicle database 285 may store and maintain stored vehicle identifying data corresponding to the vehicle identifying data stored in each vehicle 110. Vehicle database 285 may further comprise associated transaction account data corresponding to each vehicle 110 registered with payment network 170. For example, vehicle database 285 may store and associate with each stored vehicle identifying data a user identifier (e.g., user ID), transaction account number, or the like. Vehicle database 285 may be in electronic and/or logical communication with remote payment gateway 280 and/or transaction systems 290, and may comprise any suitable type of database or database structure.

Transaction systems 290 may be configured to register one or more vehicles 110 with payment network 170 and receive and settle the automated remote transactions, as discussed further herein. Transaction systems 290 may comprise one or more backend systems, payment processing systems, or the like in payment network 170. For example, transaction systems 290 may comprise one or more authorization engines, authentication engines and databases, settlement engines and databases, accounts receivable systems and databases, accounts payable systems and databases, and/or the like. Transaction systems 290 may also comprise a tokenization engine configured to tokenize transaction account numbers when provisioning a transaction account number to a vehicle 110, as discussed further herein. Transaction systems 290 may be in electronic and/or logical communication with remote payment gateway 280 and/or vehicle database 285.

The various communications discussed herein may be performed using a network. As used herein, the term "network" may further include any cloud, cloud computing system or electronic communications system or method that incorporates hardware and/or software components. Communication among the parties may be accomplished through any suitable communication channels such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not he detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

Referring now to FIGS. 3 and 4, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3 and 4, but also to the various system components as described above with reference to FIGS. 1 and 2.

With specific reference to FIG. 3, a process 301 is disclosed for registering a vehicle for automated remote transactions, in accordance with various embodiments. A user (e.g., a vehicle driver, vehicle passenger, vehicle owner, software system, smartphone app, scheduling system, etc.) may access multimedia center 215 in vehicle 110 to begin the registration and onboarding process for automated remote transactions. For example, the user may interface with multimedia center 215 to access payment network 170. Payment network 170 may request that the user login to access payment network 170 such as, for example, by inputting a username and password, biometric input, or the like. In various embodiments, payment network 170 may not require a login in order for the user to begin vehicle registration for automated remote transactions. In various embodiments, payment network 170 receives a vehicle registration request (step 302) from vehicle 110. In response to receiving the vehicle registration request, payment network 170 retrieves vehicle identifying data (step 304) from vehicle 110. For example, payment network 170 may communicate with processor 223 to retrieve vehicle identifying data (e.g., the vehicle identification number (VIN), the vehicle manufacture date, the vehicle make, the vehicle model, etc.) from memory 225. Processor may retrieve the vehicle identifying data and transmit the data to payment network 170.

Payment network 170 determines whether additional authentication is needed (step 306). In response to determining that additional authentication is needed (e.g., based on a fraud determination using stored fraud information, or the like), payment network 170 may be configured to prompt the user for additional information. For example, payment network 170 may be configured to prompt the user, via multimedia center 215, to input user identification data, such as, a driver's license, identification card, passport, social security number (SSN), biometric input and/or any other identity-based data. Payment network 170 may validate the user identification data using internal and/or external data sources. For example, payment network 170 may validate the user identification data by querying LEXIS NEXIS®, the United States Post Office, utility providers, password validation services, and/or any other consumer reporting agency, vendor, database, or system that provides information regarding consumers and businesses. The internal and/or external data source may return whether the user identification data is accurate and valid. As a further example, payment network 170 may prompt the user with a multi-factor authentication request. For example, if the user previously registered with payment network 170 using a biometric input, payment network may prompt the user to input the biometric input together with the user's password (e.g., a 2-factor authentication), via multimedia center 215. As a further example, two-factor authentication may comprise sending an authentication number (e.g., a PIN, a code, a 6-digit number, etc.) via an established email address or mobile phone number (via SMS), and prompting the user to input the authentication number into multimedia center 215 before proceeding.

In various embodiments, payment network 170 may prompt the user to select a transaction account to provision (step 308). For example, in response to the user having more than one transaction account, or sub-accounts, registered with payment network 170, payment network 170 may prompt the user to select the transaction account to use for payments during the automated remote transaction process. In various embodiments, the user may select to provision a different transaction account, or sub-account, based on different operators of vehicle 110 (e.g., based on biometric input into multimedia center 215).

In various embodiments, the user may also select one or more payment restriction controls for each provisioning transaction account. For example, the user may select a monetary value to provision in a given transaction account (e.g., $100.00), a total monetary limit (e.g., the remote payment is authorized up to $500.00), and/or any other suitable payment restriction control.

In various embodiments, the user may also elect to use reward points (e.g., member points, loyalty points, etc.) or the like to complete the transaction. For example, the reward points may correspond to lodging system 140, to the transaction account, or the like. The user may select as a payment restriction control to use reward points in the system as a default primary form of payment. Moreover, and in accordance with various embodiments, one or more accommodations available in lodging system 140 may also offer discounts, coupons, or the like for reservations completed using lodging system 140.

Payment network 170 maps the vehicle identifying data to the user transaction account data (step 310) and stores the data in vehicle database 285. For example, payment network 170 may store the vehicle identifying data and the associated user account data based on a user identifier or the like.

Payment network 170 generates a private key and public key pair (step 312) and transmits the key pair to TPM 230 of vehicle 110. Payment network 170 may generate the asymmetric key pair using any suitable technique and key hierarchy. Payment network 170 may transmit the private key and public key pair to TPM 230, via processor 223.

Payment network 170 generates a payment token (step 314) based on the provisioned transaction account. For example, payment network 170, via a tokenization engine or the like in transaction systems 290, may tokenize the provisioned transaction account (e.g., primary account number (PAN), etc.) to create the payment token (e.g., a digitized primary account number (dPAN)) to provide additional levels of security. Payment network 170, via transaction systems 290, may also generate limited use payment credentials (LUPO, a unique derived key (UDK), or the like depending on the protection profile of vehicle 110. The payment token may also comprise the payment restriction controls defined in step 308. Payment network 170 may return a registration completion notice to the user, displayed via multimedia center 215. In various embodiments, the payment token may be stored in payment network 170, such as, for example, in a token vault, a token service provider, or the like. In various embodiments, the payment token may be transmitted to vehicle 110 and may be stored in memory 225 of remote transaction system 220.

With specific reference to FIG. 4, a process 401 for initiating an automated remote transaction between a vehicle and a lodging system is disclosed, in accordance with various embodiments. For example, a user in vehicle 110 may desire to book an accommodation while traveling in vehicle 110. The user may access multimedia center 215 to begin the process. Multimedia center 215, via the GPS or the like, may display one or more lodging systems 140 within a defined proximity (e.g., 5 miles, 10 miles, by town or city, etc.). The user may select a lodging system 140 to initiate the process.

Vehicle 110 contacts lodging system 140 (step 402) to open communications between the parties. For example, remote transaction system 220, via processor 223, may interact with the GPS to locate one or more lodging systems within a defined proximity (e.g., 5 miles, 10 miles, by city or town, etc.). In various embodiments, remote transaction system 220, via communications module 227 or multimedia center 215, may also access an online lodging system 140 independent of the defined proximity (e.g., EXPEDIA®, ORBITZ®, TRAVELOCITY®, etc.). Remote transaction system 220, via communications module 227 or multimedia center 215, may transmit an automated remote transaction request to lodging system 140, via booking platform 260. Lodging system 140 verifies that vehicle 110 is capable of automated remote transactions (step 404). For example, in response to receiving the automated remote transaction request from vehicle 110, booking platform 260 of lodging system 140 may initiate a handshake with communications module 227 of vehicle 110, and may pass data to verify that vehicle 110 is capable of performing the automated remote transaction. The automated remote transaction request may identify vehicle 110 as being equipped to complete remote transactions.

In various embodiments, vehicle 110 may transmit a user accommodation profile to lodging system 140 (step 406). The user accommodation profile may comprise filters based on the user's accommodations preferences, such as, for example, a type of lodging (e.g., hotel, motel, short term rental, etc.), a lodging brand (e.g., HILTON®, MARRIOTT®, WYNDHAM®, etc.), a room preference (e.g., a queen bed, two twin beds, non-smoking, etc.), a lodging amenity (e.g., pool access, on-site gym, continental breakfast, etc.), a lodging price (e.g., a price range, maximum price, etc.), and/or any other suitable or desired preference. For example, the user accommodation profile may be stored in memory 225, and processor 223 may retrieve the user accommodation profile and instruct communications module 227 to transmit the user accommodation profile to booking platform 260 of lodging system 140.

Lodging system 140 returns available accommodations (step 408). For example, lodging system 140, via booking platform 260, may transmit the available accommodations to vehicle 110, via communications module 227, and the available accommodations may be displayed on multimedia center 215 for user review (e.g., via processor 223 receiving the available accommodations and transmitting the data to multimedia center 215). In various embodiments, the available accommodations may comprise one or more hotels, motels, short term rentals, or the like, or may comprise individual rooms corresponding to the one or more hotels, motels, short term rentals, or the like. The available accommodations may also comprise accommodation property data of each accommodation, such as, for example, accommodation price, accommodation amenities, accommodation room properties, or the like. In various embodiments, in response to the user transmitting the user accommodation profile to lodging system 140 (e.g., in step 406), the available accommodations may be based on the user accommodation profile. In various embodiments, lodging system 140 may obtain the available accommodations by parsing websites, systems, or databases of nearby hotels or similar accommodations. In various embodiments, hotels or similar accommodations may also register with lodging system 140 and provide availability via an API or similar web service that the hotel or similar accommodations exposes for remote transactions.

Vehicle 110 transmits a booking request to lodging system 140 (step 410). The booking request may comprise an accommodation selection, a booking price, the vehicle identifying data (e.g., the VIN, the vehicle manufacture date, the vehicle make, the vehicle model, the vehicle license plate number, and/or the like), and/or a user device 105 phone number. The accommodation selection may be based on a user selection of the available accommodations received in step 408. For example, the user may access multimedia center 215 to review and select a desired accommodation. In response to receiving the accommodation selection, multimedia center 215 may transmit the data to processor 223. Processor 223 may retrieve the vehicle identifying data and/or the user device 105 phone number from memory 225. In various embodiments, processor 223 may also encrypt the booking request using the private key stored in TPM 230 prior to instructing communications module 227 to transmit the data to lodging system 140.

In various embodiments, TPM 230 may also be configured to transmit, via communications module 227, one or more vehicle integrity metrics to payment network 170. For example, TPM 230 may act as a root of trust (RoT), and may provide a RoT for storage, a RoT for measurement, a RoT for reporting, and/or the like. TPM 230 may calculate vehicle integrity metrics based on Trusted Computing Group (TCG) 2.0 specifications. In that regard, TPM 230 may measure ranges of code and firmware to generate a baseline vehicle integrity metric, and may store the baseline vehicle integrity metric in a platform configuration register (PCR) in TPM 230. At the time of sale, TPM 230 may again measure ranges of code and firmware to generate a second vehicle integrity metric. TPM 230 may compare the baseline vehicle integrity metric with the second vehicle integrity metric to determine whether an unauthorized change has occurred. TPM 230 may transmit the vehicle integrity metric to payment network 170.

In response to receiving the booking request, point of sale 250 in lodging system 140 transmits the vehicle identifying data and the booking price to payment network 170 (step 412), via remote payment gateway 280. Point of sale 250 may also transmit a merchant ID or the like to notify payment network 170 of the account that payment is to be transferred to.

In various embodiments, in response to receiving the vehicle identifying data and the booking price, payment network 170 may prompt the user for a payment authentication (step 414). Payment network 170 may determine that payment authentication is needed based on any suitable fraud or risk factors, fraud decisioning engine, or the like. For example, payment network 170 may be configured to prompt the user, via multimedia center 215, to verify the transaction authorization using a multi-factor authentication request. For example, if the user previously registered with payment network 170 using a biometric input, payment network may prompt the user to input the biometric input either alone or together with the user's password (e.g., a 2-factor authentication), via multimedia center 215. As a further example, two-factor authentication may comprise sending an authentication number (e.g., a PIN, a code, a 6-digit number, etc.) via an established email address or user device 105 phone number (via SMS), and prompting the user to input the authentication number into multimedia center 215 before proceeding with the transaction.

Payment network 170 processes the vehicle identifying data and the booking price (step 416). For example, payment network 170 may use the public key to decrypt the encrypted vehicle identifying data and may compare the decrypted vehicle identifying data to the stored vehicle identifying data from vehicle database 285 to determine whether the decrypted vehicle identifying data matches the stored vehicle identifying data. In response to the data matching and the user being properly registered, payment network 170 may authorize and settle the transaction using any suitable method. Payment network 170 transmits a remote payment approval (step 418) to vehicle 110 and/or lodging system 140. The remote payment approval may comprise data indicating that the transaction was successfully authorized and/or settled. The remote payment approval may also comprise the payment amount authorized for the transaction. In response to receiving the remote payment approval, remote transaction system 220 of vehicle 110 may be configured to store the data as proof of the completed transaction.

In various embodiments, in response to receiving the remote payment approval (or in response to transmitting the vehicle identifying data and booking price to payment network 170), lodging system 140 may be configured to transmit a booking confirmation to vehicle 110 (step 420). The booking confirmation may comprise data indicating that the accommodation was successfully hooked, such as for example, an accommodation identifying number (e.g., room number, address of a short term rental, etc.), accommodation directions, or the like. The accommodation directions may comprise the lodging address, GPS coordinates, or the like. In that regard, processor 223 may transmit the accommodation directions to multimedia center 215, and multimedia center 215, using GPS, may display directions to the booked accommodation. Booking platform 260 may be configured to generate the booking confirmation, and transmit the booking confirmation to remote transaction system 220, via communications module 227.

In various embodiments, lodging system 140 may also transmit an access token to vehicle 110 (step 422). For example, in response to the accommodation having a parking garage, lot, structure, or the like having protected access, lodging system 140, via booking platform 260, may generate (provision) an access token (e.g., a parking access token) to allow the user access to the parking garage, lot, structure, etc. The access token may comprise authorizing data configured to grant access, and may comprise access controls, such as for example, an expiration date, a parking restriction control (e.g., controls access to sections of the parking lot), and/or any other suitable control. Booking platform 260 may be configured to transmit the access token to remote transaction system 220, via communications module 227. Remote transaction system 220 may store the access token (e.g., in memory 225) for the duration of stay at the accommodation or according to the expiration date. In response to vehicle 110 accessing or being in proximity to a protected access point (e.g., a security gate, etc.) at the parking garage, lot, structure, etc., the protected access point may recognize the stored access token and grant vehicle 110 access. In that regard, the access token may be used to reduce user friction and to enable seamless access to gates, parking garages, or the like with minimal user interaction.

In various embodiments, lodging system 140 may also transmit a lodging key to user device 105 (step 424) based on the user device 105 phone number (e.g., using SMS). The lodging key may be configured to grant the user access to the accommodation. For example, the lodging key may comprise access controls granting the user access to a specific room number, workout facility, and/or other accommodation amenities; a lodging key expiration date; or any other suitable controls. Booking platform 260 may be configured to generate the lodging key based on the booked accommodation. Booking platform 260 may transmit the lodging key to user device 105, and user device 105 may be configured to store the lodging key. In response to the user accessing the accommodation, the user may use the user device 105, such as, for example, by interacting with a transponder or door control near the accommodation. For example, user device 105 may interact with the transponder using near field communications (NFC), Bluetooth, or the like. The transponder may receive the lodging key and authorize access to the accommodation. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication interface and Protocol-2 (NFCIP-2); and EMV 4.2 available at http://www.emvco.com/default.aspx.

In various embodiments, the lodging key may be configured to be deactivated remotely by lodging system 140 (e.g., by the owner of the accommodation). The lodging key may also be transferable to enable the user to transfer or duplicate (e.g., via a smartphone, etc.) the lodging key onto a device of a second user. Transferability be controlled based on an access control specified by lodging system 140.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAY-STATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website or application; a social media site, application, or platform; affiliate or partner websites and applications; an external vendor, and a mobile device communication. Examples of social media sites, applications, and platforms may include FACEBOOK®, INSTAGRAM®, LINKEDIN®, PINTEREST®, QZONE®, SNAPCHAT®, TWITTER®, VKontakte (VK) and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUV®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure from a frame buffer not shown) for display on a display unit.

The computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel), This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, "issue a debit," "debit" or "debiting" refers to either causing the debiting of a stored value or prepaid card-type financial account, or causing the charging of a credit or charge card-type financial account, as applicable.

Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT ACCESS® or MICROSOFT SQL SERVER® MICROSOFT® Corporation (Redmond, Washington), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the blockchain-based system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El GamaL Schorr signature, DSA, PGP, PKI, GPG (GnuPG), HPE Format-Preserving Encryption (FPE), Voltage, and symmetric and asymmetric cryptosystems. The systems and methods may also incorporate Si-IA series cryptographic methods as well as ECC (Elliptic Curve Cryptography) and other Quantum Readable Cryptography Algorithms under development.

The computing unit of the 'Neb client may be further equipped with an Internet brm,vser connected to the Internet or an intranet using standard dial-up, cable, DSL or any other Internet protocol knov,m in the art Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SER- VICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript, or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager such as, for example, Parallel Multithreaded Machine ("PM2"); a resource and performance monitoring tool such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an interact based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3 and 4, the process flows and/or screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The disclosure and claims do not describe only a particular outcome of automating remote transactions between a vehicle and a lodging system, but the disclosure and claims include specific rules for implementing the outcome of automating remote transactions between a vehicle and a lodging system and that render information into a specific format that is then used and applied to create the desired results of enabling automated remote transactions between a vehicle and a lodging system, as set forth in *McRO, Inc. v. Bandai Namco Games America Inc.* (Fed. Cir. case number 15-1080, Sep. 13, 2016). In other words, the outcome of automating remote transactions between a vehicle and a lodging system can be performed by many different types of rules and combinations of rules, and this disclosure includes various embodiments with specific rules. While the absence of complete preemption may not guarantee that a claim is eligible, the disclosure does not sufficiently preempt the field of automating remote transactions between a vehicle and a lodging system at all. The disclosure acts to narrow, confine, and otherwise tie down the disclosure so as not to cover the general abstract idea of just automating remote transactions between a vehicle and a lodging system. Significantly, other systems and methods exist for automating remote transactions between a vehicle and a lodging system, so it would be inappropriate to assert that the claimed invention preempts the field or monopolizes the basic tools of automating remote transactions between a vehicle and a lodging system. In other words, the disclosure will not prevent others from automating remote transactions between a vehicle and a lodging system, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/resealing obscured textual information of an underlying window to become automatically viewable to the user (e.g., via multimedia center 215). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., the user accommodation profile, the booking request, the booking confirmation, etc.) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for an automated remote transaction comprising:

transmitting, by an Internet of things (IoT) device and via a computer network, a request for the automated remote transaction with a booking platform;

receiving, by the IoT device and in response to the request, from the booking platform, a set of available services;

generating, by the IoT device, a booking request by using a private key, wherein the booking request is further generated based at least in part on a selection of at least one available service on a user interface for another device in communication with the IoT device, wherein the private key is stored in the other device, and the private key has been associated with information identifying the other device;

transmitting, by the IoT device, the booking request to the booking platform, wherein the booking request comprises the at least one available service from the set of available services, a booking price, and the information identifying the other device, wherein the booking platform transmits the information identifying the other device and the booking price to a payment network, wherein the payment network compares the information identifying the other device and stored information identifying the other device to determine whether the information identifying the other device matches the stored information identifying the other device and whether additional authentication is needed, and wherein the payment network is configured to register one or more other devices for automated remote transactions, and further configured to authorize and complete the automated remote transaction between the other device and the booking platform;

in response to determining that the additional authentication is needed based on a fraud determination using stored fraud information, prompting, by the IoT device, a user of the IoT device for additional information including a biometric input, wherein the biometric input is captured by a biometric sensor communicatively coupled to the IoT device and is positioned in a vehicle;

transmitting, by the IoT device to the payment network, the biometric input; and receiving, by the IoT device from the booking platform, in response to a validation of the information identifying the other device and the biometric input, an electronic access token associated with the other device and the at least one available service, wherein the electronic access token comprises authorization data to receive the at least one available service.

2. The method of claim 1, further comprising:

transmitting, by the IoT device, a user accommodation profile to the booking platform, wherein the booking platform is configured to transmit the set of available services based on the user accommodation profile.

3. The method of claim 1, further comprising:

receiving, by the IoT device, a booking confirmation from the booking platform in response to the booking platform completing booking of the at least one available service, wherein the booking confirmation comprises GPS directions to the at least one available service.

4. The method of claim 1, wherein the other device is the vehicle.

5. The method of claim 4, further comprising:

receiving, by the IoT device, from the payment network a request specifying a prompt for a passenger of the vehicle to enter information needed to authenticate the passenger for a payment transfer in response to receiving information identifying the vehicle and the booking price, and a fraud determination wherein the fraud determination is based on a risk factor;

in response to the request, prompting, by the IoT device, the passenger of the vehicle to take the biometric input via the biometric sensor positioned within the vehicle; and transmitting, by the IoT device, to the payment network, a biometric sample of the passenger of the vehicle.

6. The method of claim 1, further comprising:

receiving, by the IoT device, a provisioned parking access token from the booking platform in response to the booking platform completing booking of the at least one available service.

7. The method of claim 1, further comprising:

transmitting, by the IoT device, a registration request to register the other device for the automated remote transactions to the payment network, wherein in response to receiving the registration request, the payment network prompts the IoT device to transmit the information identifying the other device; and transmitting, by the IoT device, the information identifying the other device to the payment network, wherein the payment network is configured to associate the information identifying the other device with transaction account data.

8. The method of claim 7, further comprising:

transmitting, by the IoT device, a transaction account number to provision for the automated remote transactions, wherein the payment network is configured to generate a payment token based on the transaction account data corresponding to the transaction account number.

9. The method of claim 1, further comprising:

determining whether the other device is accessing or is in proximity to a protected access point; and in response to determining that the other devices is accessing or is in proximity to the protected access point, recognizing the electronic access token by the protected access point to grant access to the other device.

10. The method of claim 1, wherein the IoT device comprises a root of trust system of a vehicle.

11. A computer-based system for an automated remote transaction, comprising:

a computing device that includes a processor and a memory; and machine-readable instructions stored in the memory, wherein the machine-readable instructions, in response to execution by the processor, cause the computing device to at least:

receive, from an Internet of things (IoT) device, a registration request;

receive, from the IoT device, information identifying another device in communication with the IoT device;

in response to receiving the registration request and the information identifying the other device, generate a private key, wherein the private key is associated with the information identifying the other device;

transmit the private key to the other device, wherein the private key is stored in a root of trust system of the other device;

receive from a booking platform the information identifying the other device and a booking price associated with the automated remote transaction, wherein information received from the booking platform is encrypted using the private key stored in the root of trust system;

decrypt, using a public key, information to obtain at least decrypted the information identifying the other device;

in response to determining that additional authentication is needed based on a fraud determination using stored fraud information, transmit, to the IoT device, a request specifying a prompt for a user of the IoT device to enter a biometric input;

receive, from the IoT device, the biometric input, wherein the biometric input is captured by a biometric sensor communicatively coupled to the IoT device;

compare the information identifying the other device and the biometric input and stored information identifying the other device to determine whether the information identifying the other device matches the stored information identifying the other device; and in response to the determination that the information identifying the other device matches the stored information identifying the other device, transmit, to the booking platform, data indicating (i) that the automated remote transaction is authorized and (ii) a payment amount is authorized for the automated remote transaction.

12. The computer-based system of claim 11, wherein the machine-readable instructions, in response to the execution by the processor, cause the computing device to at least:

determine whether further authentication is needed;

in response to determining that the further authentication is needed, prompt the user for additional information.

13. The computer-based system of claim 11, wherein the machine-readable instructions, in response to the execution by the processor, cause the computing device to at least:

prompt the user to select a transaction account number to provision for the automated remote transaction;

store, in the memory, an association between the transaction account number and the information identifying the other device; and generate a payment token based on transaction account data corresponding to the transaction account number.

14. The computer-based system of claim 13, wherein the machine-readable instructions, in response to the execution by the processor, cause the computing device to at least:

receive from the user one or more payment restriction controls corresponding to the transaction account number; and wherein the payment token comprises the one or more payment restriction controls.

15. The computer-based system of claim 13, wherein the machine-readable instructions, in response to the execution by the processor, cause the computing device to at least:

transmit to the other device the payment token.

16. An article of manufacture including a non-transitory, tangible computer readable storage medium having instructions stored thereon that, in response to execution by a computer-based system of a payment network, cause the computer-based system to at least:

receive, by a computing device of the computer-based system and from an Internet of things (IoT) device, a registration request;

receive, by the computing device of the computer-based system and from the IoT device, information identifying another device in communication with the IoT device;

in response to receiving the registration request and the information identifying the other device, generate a private key, wherein the private key is associated with the information identifying the other device and wherein the private key is stored in a root of trust system of the other device;

transmit the private key to the other device, wherein the private key is stored in the root of trust system of the other device;

receive from a booking platform information identifying the other device and a booking price associated with an automated remote transaction;

in response to determining that additional authentication is needed based on a fraud determination using stored fraud information, transmit, to the IoT device, a request specifying a prompt for a user of the IoT device to enter a biometric input;

receive, from the IoT device, the biometric input, wherein the biometric input is captured by a biometric sensor communicatively coupled to the IoT device and is positioned in a vehicle;

compare the information identifying the other device and the biometric input and stored information identifying the other device to determine whether the information identifying the other device matches the stored information identifying the other device; and in response to the determination that the information identifying the other device matches the stored information identifying the other device, transmit, to a booking platform, data indicating (i) that the automated remote transaction is authorized and (ii) a payment amount is authorized for the automated remote transaction.

17. The article of manufacture of claim 16, wherein the instructions stored thereon that, in response to the execution by the computer-based system, cause the computer-based system to at least:

determine whether further authentication is needed;

in response to determining that the further authentication is needed, prompt the user for the additional information.

18. The article of manufacture of claim 16, wherein the instructions stored thereon that, in response to the execution by the computer-based system, cause the computer-based system to at least:

prompt the user to select a transaction account number to provision for the automated remote transaction;

store, in the memory, an association between the transaction account number and the information identifying the other device; and generate a payment token based on transaction account data corresponding to the transaction account number.

* * * * *